J. J. MICHALSKI.
THEFT DETECTOR FOR AUTOMOBILES.
APPLICATION FILED JUNE 22, 1921.
1,419,401.     Patented June 13, 1922.
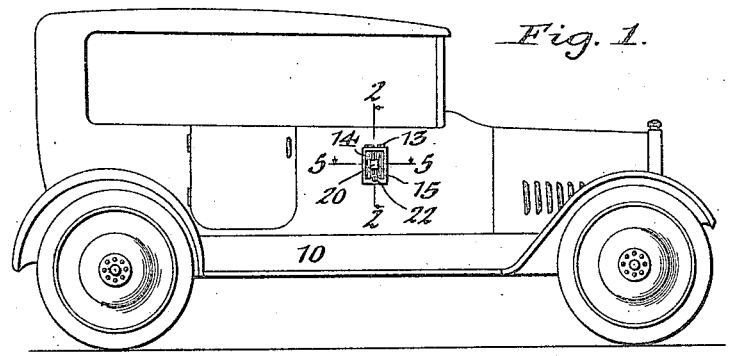
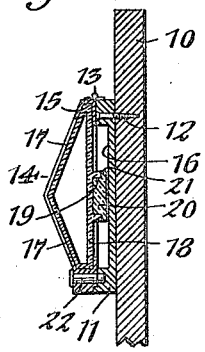 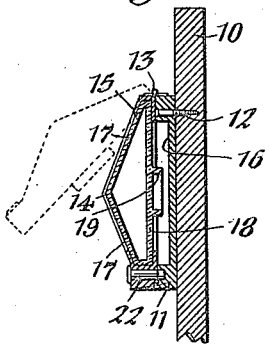 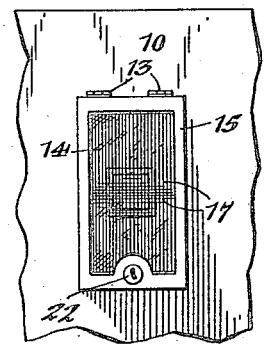
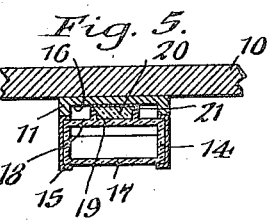
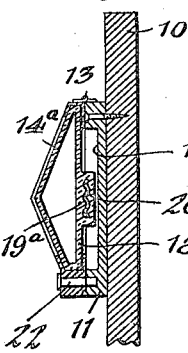
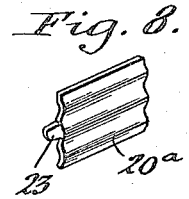
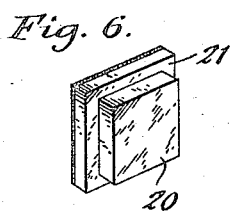
Joseph J. Michalski, Inventor,
by George Popp
Attorneys.

UNITED STATES PATENT OFFICE.

JOSEPH J. MICHALSKI, OF BUFFALO, NEW YORK.

THEFT DETECTOR FOR AUTOMOBILES.

1,419,401.     Specification of Letters Patent.   Patented June 13, 1922.

Application filed June 22, 1921. Serial No. 479,630.

*To all whom it may concern:*

Be it known that I, JOSEPH J. MICHALSKI, a citizen of the United States, residing at Buffalo, in the county of Erie and State of New York, have invented new and useful Improvements in Theft Detectors for Automobiles, of which the following is a specification.

This invention relates to a detector or identifying device for protecting automobiles and similar vehicles from theft.

Its chief object is to provide a conspicuous device of this character by which policemen and others may readily detect whether or not the vehicle is being driven by the owner or by some unauthorized person.

Another object of the invention is to produce a simple and inexpensive detecting device which can be readily installed and conveniently manipulated.

A still further object is to provide a device of this character which is visible both day and night.

In the accompanying drawings: Figure 1 is a side elevation of an automobile showing my improvement applied thereto with the detecting member in position. Figure 2 is an enlarged vertical transverse section on line 2—2, Fig. 1. Figure 3 is a view similar to Fig. 2, but showing the detecting member removed. Figure 4 is an enlarged face view of the improvement with the detecting member removed. Figure 5 is an enlarged horizontal section on line 5—5, Fig. 1. Figure 6 is a perspective view of the detecting member. Figure 7 is a vertical transverse section of a modified form of the improvement. Figure 8 is a perspective view of the identifying member thereof.

Similar characters of reference indicate corresponding parts throughout the several views.

In the drawings, the improvement is shown as applied to the side of an automobile 10, although the same may be located in any other convenient place where it is conspicuous and clearly visible. If desired, one of the devices may be placed on either side of the automobile body or at both the front and rear ends thereof.

In the preferred embodiment of the detecting device shown in Figs. 1–5, the same comprises a rectangular base or box-like casing 11 of wood or other appropriate material which may be permanently secured to the vehicle body by means of screws 12. Connected to the upper end of this casing by hinges 13, is a vertically-swinging cover or lid 14 of glass or other transparent material which is arranged in a suitable frame 15. The front face 16 of said casing has a uniformly colored surface or background such, for example, as red, which is bright and conspicuous, and clearly visible through the transparent cover. As shown in Figs. 2, 3 and 5, this cover is preferably of hollow prismlike form, its front side being provided with oppositely-sloping walls 17, 17 which meet substantially midway of the length of the cover. The rear wall 18 of the latter is straight and in the closed position of the cover bears against the face or rim of the casing 11. This inner wall is provided with an inwardly-opening recess or pocket 19 of substantially rectangular form which is preferably disposed directly in rear of and in alinement with the apex of the sloping front walls 17. Removably arranged in this pocket is a detecting member 20 which is preferably in the form of a block and of a size to cover a portion of the background of the casing, as shown in Figs. 1 and 2. This member may be constructed of any suitable material, but preferably one having a highly finished reflecting surface, such as a mirror, and of any appropriate color, for example, white, which contrasts with the red background 16 of the casing. To render said detecting member and the contrasting background of the casing visible at night, as well as during the day, they may be provided with a luminous surface of any appropriate or well-known material.

If desired, that portion of the inner wall 18 surrounding the pocket 19 may be colored to correspond to the background 16 of the casing 11, while the bottom of the pocket itself is left uncolored so as to be transparent.

To facilitate the insertion and removal of the detecting member into and from its pocket 19, it may be provided with a head or flange 21 which overlaps the rim of the pocket, as shown in Figs. 2 and 5.

The lower end of the cover is provided with a key-operated or other suitable lock 22, for locking the same to the casing and preventing access thereto, except by authorized persons.

When the owner or other authorized person occupies or drives the automobile, he sees to it that the detecting member 20 is located in its pocket and that the cover 14 is locked. In this position of the device, which is shown in Fig. 1, the detecting member stands out conspicuously against the contrasting red background 16 of the casing, serving as an indication to patrolmen and others that the vehicle is under the control of an authorized person. When the car is left standing or parked, the owner unlocks the cover and removes the detecting member 20 from its pocket and keeps it in his possession, after which he again closes the cover and locks it, leaving nothing but the red background exposed to view and indicating that the owner has left the car unoccupied. Should the car be traveling along the streets with the red background completely exposed, that circumstance will naturally arouse the suspicion that the vehicle is being stolen, and patrolmen or others can therefore promptly take the necessary steps to arrest the thief.

By providing the cover 14 with oppositely-sloping walls 17, it is practically impossible to simulate the reflecting surface of the detecting member 20 by pasting a strip of paper or the like to the outer surface of the cover.

While affording effective protection against the theft of vehicles, this improved detector is simple and compact in construction and neat in appearance.

A removable detecting element of a different character may be substituted for the block 20, if desired. For example, in the modification of the invention shown in Figs. 7 and 8, the cover 14ª is provided in its rear wall 18ª with an opening or open-ended pocket 19ª having corrugated or irregularly-formed side walls. A detecting or identifying member 20ª, correspondingly formed or corrugated, is adapted to be removably placed in this pocket in the same manner as the detecting member in the previously-described construction. Said member 20ª may be provided with a suitable finger piece 23 for conveniently manipulating it. In this case, the detecting members of different automobiles vary, so that each of such members fits only the corresponding pocket, rendering it impossible for unauthorized persons to practice deception by the use of similar detecting members.

It will be understood from the foregoing that various other modifications may be made without departing from the spirit of this invention as covered by the appended claims.

I claim as my invention:

1. A theft-detector of the character described, comprising a base-member having a characteristic background, a transparent cover for said base-member movable relatively thereto, a detecting member interposed between said cover and said background and normally overlying the latter, said detecting member being visible through said cover, and means for holding said cover in normal position.

2. A theft-detector of the character described, comprising a base-member having a characteristic background, a second member movable relatively to said base-member, means for locking said movable member to said base-member, and a removable detecting-member of a different characteristic nature from said background carried by said movable member, said detecting member being arranged to normally cover a portion of said background and being inaccessible in the locked position of said movable member.

3. A theft-detector of the character described, comprising a pair of contrasting complementary members, one of which is adapted for attachment to a vehicle, a transparent part normally covering said first-named member and movable relatively thereto, the other of said members being detachably mounted on said transparent part, and means for locking the latter to said first-named member.

4. A theft-detector of the character described, comprising a casing adapted to be secured to a vehicle and having a characteristic ground on its face, a movable transparent part extending over the ground of said base, a detecting member of a different characteristic nature arranged between said part and said base and normally covering a portion thereof, and means for locking the movable part to the base.

5. A theft-detector of the character described, comprising a base adapted to be secured to a vehicle and having a colored background, a transparent cover for said casing, means for locking said cover, and a detecting member of smaller area than said background arranged between said casing and said cover, said detecting member contrasting in color with said background.

6. A theft-detector of the character described, comprising a base adapted to be secured to a vehicle and having a colored background on its face, a transparent cover for said base, means for locking said cover, and a detecting member removably mounted on the inner side of said cover and contrasting in color with said background.

7. A theft-detector of the character described, comprising a base adapted to be secured to a vehicle and having a colored background on its face, a transparent cover for said base having a pocket opening toward the latter, means for locking said cover, and a removable detecting member arranged in said pocket and contrasting in color with said background.

8. A theft-detector of the character described, comprising a base adapted to be secured to a vehicle and having a colored background on its face, a transparent cover hinged to said base, a detecting member removably mounted on the inner side of said cover and contrasting in color with said background, and means for locking said cover to said base.

9. A theft-detector of the character described, comprising a base adapted to be secured to a vehicle and having a colored background on its face, a transparent cover for said casing having a prismatic outer surface, and a removable detecting member interposed between said base and said cover and contrasting in color with said background.

10. A theft-detector of the character described, comprising a base adapted to be secured to a vehicle and having a colored background on its face, a transparent cover for said casing having a prismatic front wall and a straight rear wall, the latter having a pocket opening toward said base, means for locking said cover, and a detecting member removably arranged in said pocket and contrasting in color with said background.

JOSEPH J. MICHALSKI.